UNITED STATES PATENT OFFICE.

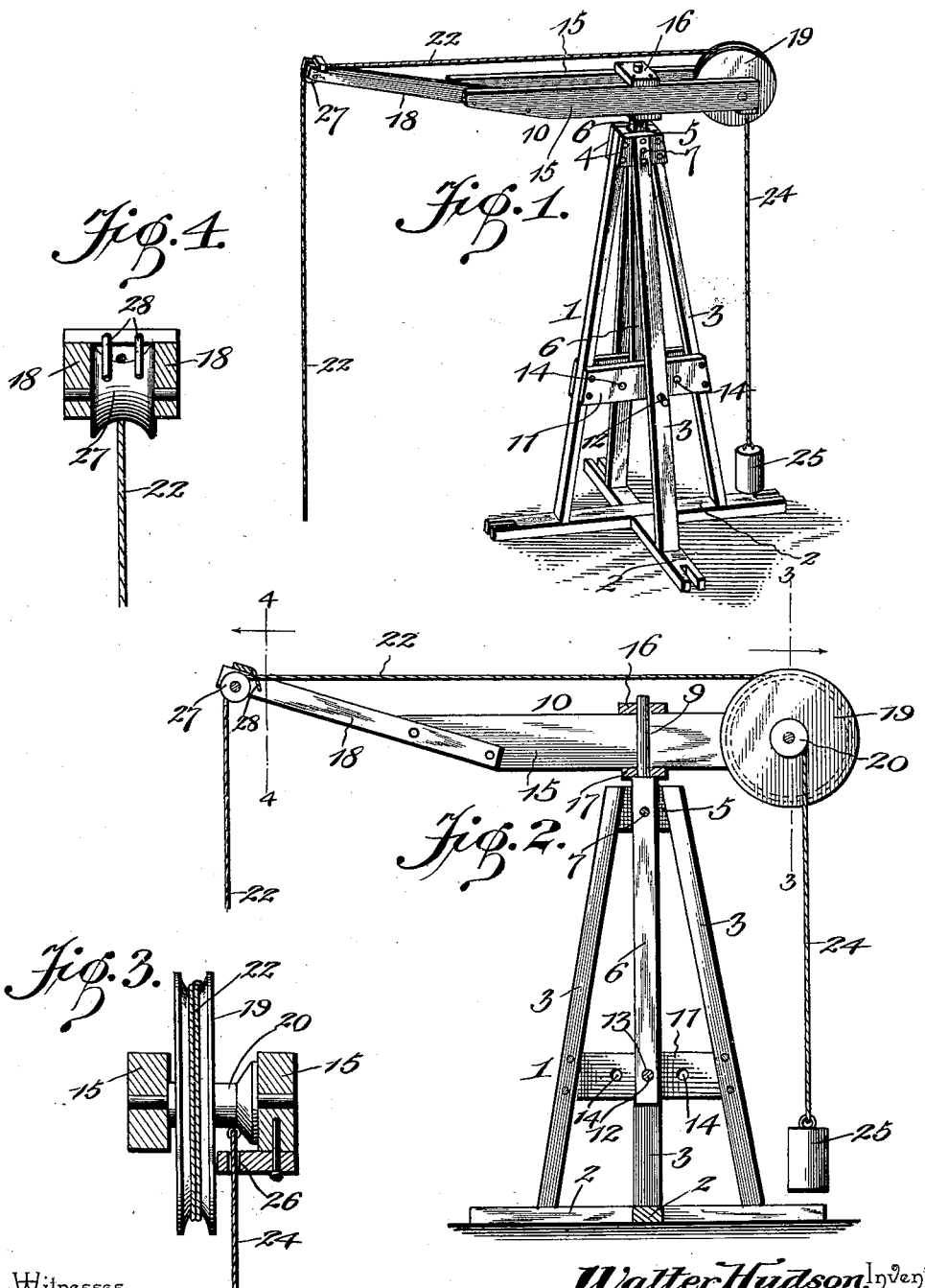

WALTER HUDSON, OF BARFIELD, ALABAMA.

TETHER.

SPECIFICATION forming part of Letters Patent No. 636,407, dated November 7, 1899.

Application filed June 21, 1899. Serial No. 721,369. (No model.)

*To all whom it may concern:*

Be it known that I, WALTER HUDSON, a citizen of the United States, residing at Barfield, in the county of Clay and State of Alabama, have invented a new and useful Tether, of which the following is a specification.

The invention relates to improvements in tethers.

The object of the present invention is to improve the construction of tethers and to provide a simple, inexpensive, and efficient one adapted to be readily constructed and capable of confining the grazing of an animal within certain limits and of yielding to the movements of it to prevent the same from becoming entangled in the tethering-rope or wrapping the same around the support.

A further object of the invention is to provide a tether adapted to be mounted and used on the sides of hills and capable of ready adjustment to cause the rotating arm or frame to revolve in a horizontal plane.

The invention consists in the construction and novel combination and arrangement of parts, as hereinafter fully described, illustrated in the accompanying drawings, and pointed out in the claims hereto appended.

In the drawings, Figure 1 is a perspective view of a tether constructed in accordance with this invention. Fig. 2 is a vertical longitudinal sectional view. Fig. 3 is a detail sectional view on line 3 3 of Fig. 2. Fig. 4 is a similar view on line 4 4 of Fig. 2.

Like numerals of reference designate corresponding parts in all the figures of the drawings.

1 desinates a supporting-frame provided with a horizontal base composed of crossed horizontal bars 2, centrally secured together and having their ends slotted or bifurcated to enable the supporting-frame to be readily staked or anchored at the desired point. The supporting-frame, which is slightly tapering, as clearly shown in Figs. 1 and 2 of the accompanying drawings, is provided with inwardly-inclined sides or standards 3, secured at their lower ends to the horizontal bars 2 of the base and connected at their upper ends by cross-pieces 4 and arranged to form an opening 5 at the top of the frame.

Within the opening 5 of the top of the frame is mounted a bar or spindle 6, which is pivoted between its ends by a horizontal pin 7 or other suitable fastening device, that extends through the top of the supporting-frame. The bar or spindle, which extends above and depends from the top of the supporting-frame, has its upper portion reduced and rounded to form a pivot or journal 9, on which a horizontal swinging frame 10 revolves. The lower portion of the bar or spindle 6 is guided between a pair of horizontal bars 11 and is secured at the desired adjustment by a pin 12, engaging a perforation 13 of the bar or spindle and adapted to be introduced into any one of a series of registering perforations 14 of the guide-bars. One of the inclined sides or standards of the supporting-frame is provided with a perforation registering with the central perforations of the guide-bars 11. The bar or spindle 6 is adapted to be adjusted by swinging it on its pivot 7, and by this construction the tether may be set up on a hillside to permit an animal to graze thereat, and the bar or spindle 6 may be readily arranged in a perpendicular position, so that the revolving frame 10 will swing in a horizontal plane and not interfere with the free grazing of an animal, as would be the case were the rotary frame to swing in any other plane.

The rotary frame, which is substantially oblong, is composed of horizontal side bars 15, connecting-bars 16 and 17, and inclined outer side bars 18, extending upward at a slight angle to the side bars 15. The connecting or cross bars 16 and 17, which are perforated to receive the pivot or journal of the spindle, are located between the center and the rear end of the frame 10, and the latter rests upon the shoulder formed by the reduction of the upper end of the bar or spindle 6.

Between the rear ends of the side bars 15 are journaled a large pulley 19 and a small pulley 20, which may, if desired, be an extension of the hub of the larger pulley or be constructed in any other suitable manner. The large pulley 19, which is peripherally grooved, has the inner portion of a tether-rope 22 wound around it, and a weighted rope 24 is reversely wound around the small pulley 20, the weight 25 operating to wind up any slack of the tether-rope, so as to keep the latter taut at all times and prevent the same from becoming entangled with the feet of an animal. The weight 25 may consist of any heavy object, and the rope or cord 24 passes through a guide 26, arranged beneath the small pulley 20, and consisting of a block extending inward from one of the side bars 15 and provided with an opening.

The tether-rope is supported at the outer end of the frame by a guide-pulley 27, journaled between the bars 18 and provided at its periphery with a groove, and the rope is retained in the groove by a guide 28, depending from a cross-piece.

The invention has the following advantages: The tether, which is simple and inexpensive in construction, can be easily manufactured, and the revolving frame is adapted to move freely on the spindle to permit an animal to graze around the supporting-frame, and the tether-rope is adapted to be drawn outward by an animal in grazing, and the slack will be immediately taken up by the weight as the animal approaches the device, so that there is no liability of the animal becoming accidentally entangled in the rope. The device is also adapted to be used on hilly ground and may be set up on an inclined surface with its spindle arranged in a perpendicular position, so that the revolving frame which carries the tether-rope will swing horizontally.

Changes in the form, proportion, and minor details of construction may be resorted to without departing from the spirit or sacrificing any of the advantages of this invention.

What is claimed is—

1. A device of the class described comprising a supporting-frame, an upright spindle fulcrumed between its ends on the supporting-frame and having its lower portion adjustably secured to the same, whereby it may be set in a vertical position when the supporting-frame is at an inclination, a rotating frame mounted on the spindle, and means carried by the rotating frame for tethering an animal, substantially as described.

2. A device of the class described comprising a supporting-frame provided with a pair of guide-bars having perforations, an upright spindle fulcrumed between its ends on the supporting-frame and having its lower end arranged between the guide-bars, a fastening device engaging the lower end of the spindle and arranged in the perforations of the guide-bars and securing the spindle at the desired adjustment, a rotating frame mounted on the spindle, and means carried by the rotating frame for tethering an animal, substantially as described.

3. A device of the class described comprising a supporting-frame having a horizontal base and provided with inclined standards spaced apart at their upper ends to form an opening, an upright spindle fulcrumed between its ends in the said opening, guide-bars mounted on the supporting-frame and receiving the lower end of the spindle, means for securing the spindle to the guide-bars, a rotating frame mounted on the spindle, pulleys carried by the spindle, a tethering-rope arranged on the pulleys, and a weight connected with the tethering-rope, substantially as described.

In testimony that I claim the foregoing as my own I have hereto affixed my signature in the presence of two witnesses.

WALTER HUDSON.

Witnesses:
 JNO. M. LEVERITT,
 Y. C. BARFIELD.